US007290646B2

(12) United States Patent
Mustalahti et al.

(10) Patent No.: US 7,290,646 B2
(45) Date of Patent: Nov. 6, 2007

(54) CONVEYOR

(75) Inventors: Jorma Mustalahti, Hyvinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/440,997

(22) Filed: May 26, 2006

(65) Prior Publication Data

US 2006/0207857 A1 Sep. 21, 2006

Related U.S. Application Data

(63) Continuation of application No. PCT/FI2004/000661, filed on Nov. 9, 2004.

(30) Foreign Application Priority Data

Nov. 28, 2003 (FI) ................................ 20031741

(51) Int. Cl.
*B65G 23/00* (2006.01)

(52) U.S. Cl. ..................................................... 198/334

(58) Field of Classification Search ................ 198/324, 198/334, 461.1, 461.2
See application file for complete search history.

(56) References Cited

U.S. PATENT DOCUMENTS

| | | | | |
|---|---|---|---|---|
| 3,518,944 | A * | 7/1970 | Patin | 198/334 |
| 3,665,863 | A | 5/1972 | Patin | |
| 4,232,776 | A * | 11/1980 | Dean | 198/334 |
| 5,044,485 | A * | 9/1991 | Loder | 198/334 |
| 5,908,104 | A | 6/1999 | Brun-Jarret | |
| 6,454,079 | B1 * | 9/2002 | Teramoto | 198/334 |
| 6,604,621 | B1 * | 8/2003 | Matsuo et al. | 198/324 |
| 6,675,949 | B1 | 1/2004 | Alemany et al. | |

FOREIGN PATENT DOCUMENTS

| | | | |
|---|---|---|---|
| EP | 0 850 870 | A1 | 7/1998 |
| GB | 217 308 | A | 6/1924 |
| WO | WO 2005/051829 | A1 | 6/2005 |

* cited by examiner

*Primary Examiner*—James R. Bidwell
(74) *Attorney, Agent, or Firm*—Venable LLP; Robert Kinberg; Ryan M. Flandro

(57) ABSTRACT

A travelator and method for transporting passengers on a travelator. The travelator includes a plurality of successive conveyors arranged to form an acceleration section, a constant speed section including at least one conveyor having a constant transport speed, and a deceleration section. The acceleration section includes successive conveyors having constant speeds stepwise increasing in the transport direction for accelerating a passenger. The deceleration section includes successive conveyors having constant speeds stepwise decreasing in the transport direction for decelerating the passenger. The speeds of the conveyors in the acceleration section and the deceleration section are arranged such that the average acceleration experienced by the passenger over the entire length of the acceleration and deceleration sections is constant. Adjacent successive conveyors in the acceleration and deceleration sections include a common diverting element having a speed change point at which the speeds of the adjacent successive conveyors are different in the transport direction.

37 Claims, 5 Drawing Sheets

Velocity as a function of distance in the acceleration section

CONVEYOR

CROSS-REFERENCE TO RELATED APPLICATIONS

This application is a continuation of International Application No. PCT/FI2004/000661, filed Nov. 9, 2004, designating the United States and claiming priority from Finnish Application No. 20031741, filed Nov. 28, 2003. The disclosure of each foregoing application is incorporated herein by reference together with each U.S. and foreign patent and patent application mentioned below.

BACKGROUND OF THE INVENTION

The present invention relates to a method for transporting passengers on a travelator comprising successive conveyors, including: an acceleration section, in which the speed of transport of passengers is accelerated via step-wise increasing successive even speeds from a substantially slow initial speed to a heightened transport speed; a constant-speed section, in which passengers are transported at a constant speed; and a deceleration section, in which the speed of transport of passengers is decelerated via step-wise decreasing successive even speeds to a substantially slow final speed. In such a method, the transport speed is changed during the acceleration and/or deceleration section in a stepwise manner so that the average acceleration experienced by the passengers is constant substantially throughout the entire acceleration/deceleration section.

Furthermore, the invention concerns a travelator for passenger transport, comprising: a number of successive conveyors arranged to form an acceleration section, which contains successive conveyors having even speeds stepwise increasing in the transport direction for accelerating the passenger transport speed from a substantially slow initial speed to a heightened transport speed; a constant-speed section containing a conveyor/conveyors for transporting the passengers at a constant speed; and a deceleration section containing successive conveyors having even speeds stepwise decreasing in the transport direction for decelerating the passenger transport speed from the constant transport speed to a decelerated final speed. In such a travelator the speeds of the conveyors in the acceleration section and/or deceleration section have been adapted so that the average acceleration experienced by the passengers over the entire length of the acceleration/deceleration section is constant.

Japanese patent document JP 2003-20281A, discloses a travelator for passenger transport. The travelator comprises a number of successive conveyors so arranged that they form an acceleration section, a constant-speed section and a deceleration section. The acceleration section consists of a number of successive belt conveyors which move at even speeds stepwise increasing in the transport direction to accelerate the speed of transport of the passenger from a substantially slow initial speed to a higher transport speed. The constant-speed section comprises a conveyor/conveyors for transporting passengers at a constant transport speed. The deceleration section is implemented in a manner corresponding to the acceleration section but in a functionally reverse order by arranging successive conveyors moving at even speeds stepwise decreasing in the transport direction for slowing down the speed of transport of passengers from the constant transport speed to a slower final speed.

Travelators are typically used at airports, where travelators are provided between terminals and parking areas and between different terminals, at subway and railway stations and in department stores. In these applications, the transport distances are typically a few hundred meters. Transport speed is typically about 0.6 m/s and maximum speed is about 0.8 m/s. The speed is restricted by the hazard associated with the act of stepping onto or off a moving conveyor. With these low speeds it is not reasonable to make very long travelators (>200 m) because the travel time becomes inconveniently long. Traveling from end to end of a 500 m long travelator at a speed of 0.8 m/s takes 10 minutes. However, there are situations (e.g. between terminals at airports) where it is necessary to travel through distances of 200 to 1000 m or even more, where a travelator would be an advantageous solution if it had sufficient speed. At present, these needs are usually fulfilled by using bus or subway lines or by walking.

Ideas regarding a high-speed travelator have been proposed that could be used in urban centers as a form of transport competing with subway transport, but so far have not been implemented in practice anywhere. This type of travelator would be longer than earlier types, with a possible total transport distance on the order of up to about 2000 m. In the case of travelators of this length, it is also necessary to use a relatively high constant transport speed, e.g. on the order of 5 m/s. An appropriate initial/final speed corresponds roughly to the typical human walking speed.

Accelerating the travelator from a low initial speed to a high constant transport speed requires a relatively long acceleration section, and decelerating from that speed correspondingly requires a long deceleration section. If the acceleration takes place at even intervals from one constant speed step to another over the entire length of the acceleration and deceleration section e.g. in the manner described in JP 2003-20281A, this involves a problem regarding passenger comfort and human adaptability to the stepwise changing speed. In practice, the passenger moves forward on the travelator while standing on his/her feet. The person's body and feet form a flexible system which wobbles back and forth during the stepwise speed changes. When the passenger is subjected to such wobbling in a temporally continuously accelerating/decelerating tempo, which is what happens in the case of the prior-art construction of the acceleration/deceleration section of a travelator, passenger comfort suffers because the passenger is not allowed enough time to adapt to the speed changes. The passenger may even sway out of balance, which leads to hazardous situations.

Due to the above-mentioned problems, so far prior-art solutions have not aimed at reaching a very high traveling speed.

European Patent document EP 0 803 464 owned by CNIM (Constructions Industrielles de la Mediterranee—CNIM, France) discloses a travelator which has acceleration/deceleration sections implemented using adjacent rotating shafts provided with interleaved discs and a rubber belt forming a constant-speed section. Disposed between the acceleration section and the constant-speed section is a fixed plate covered with rotating balls. A high-speed travelator by CNN, has been installed at Montpamasse station in Paris. The length of the travelator is 185 m. The initial speed is 0.75 m/s to 0.8 m/s. In the constant-speed section the transport speed is 2.5 to 3 m/s. The acceleration and deceleration sections have a length of only a few meters and the maximum acceleration/deceleration within them is about 0.9 m/s2.

The use of this travelator involves risks and many passengers have stumbled and fallen on the travelator. Due to the short acceleration/deceleration section, the large change in acceleration and deceleration is unpleasant to people. Moreover, women's stiletto shoes are not compatible with the rotating shafts. In addition, the fixed plate between the acceleration/deceleration section and the constant-speed section is dangerous because one may easily trip over it.

European Patent document EP 1 253 101 owned by Thyssen discloses a high-speed travelator based on telescopic pallets, which is reported to be able to move at a speed of 2.0 m/s. The technical solution used here is probably safer than the travelator according to EP 0 803 464, but it is also very complicated as it has several parts sliding one over the other.

Both of the above travelator solutions have a relatively high acceleration/deceleration in the acceleration/deceleration section and a low maximum speed in the constant-speed section.

SUMMARY OF THE INVENTION

An object of the present invention is to overcome the above-mentioned drawbacks.

Another object of the invention is to provide a method and a travelator such that the passengers using it find traveling on the travelator a pleasant, comfortable and safe experience.

A further object of the invention is to provide a method and a travelator in which acceleration from a low initial speed to a desired high constant speed and corresponding deceleration takes place in a manner that the passenger is well able to adapt to without finding the acceleration and deceleration section an uncomfortable experience.

An additional object is to provide a travelator in which the length of the acceleration and deceleration sections is in no way limited and can be designed to a desired length.

The above and other objects are accomplished according to the invention wherein there is provided an exemplary embodiment of a method for transporting passengers on a travelator having successive conveyors, the method comprising: accelerating a speed of transport of the passengers in an acceleration section by stepwise increasing constant speeds of successive conveyors from a substantially slow initial speed to a heightened transport speed; transporting the passengers in a constant-speed section with successive conveyors operating at a constant speed; and decelerating the speed of transport of passengers in a deceleration section by stepwise decreasing the constant speed of successive conveyors to a substantially slow final speed; changing the transport speed during the acceleration and deceleration sections in a stepwise manner such that the average acceleration experienced by the passengers is constant substantially throughout the entire acceleration and deceleration sections; and changing the transport speed during the acceleration section and deceleration sections using a diverter element in adjacent successive conveyors that is common to the adjacent successive conveyors, at which diverting element the speeds of the adjacent successive conveyors are different in the transport direction.

According to another aspect of the invention there is provided an exemplary embodiment of a travelator for passenger transport, comprising: a plurality of successive conveyors arranged to form (a) an acceleration section, which includes successive conveyors having constant speeds stepwise increasing in the transport direction for accelerating a passenger transport speed from a substantially slow initial speed to an increased transport speed, (b) a constant-speed section containing at least one conveyor having a constant passenger transport speed, and (c) a deceleration section containing successive conveyors having constant speeds stepwise decreasing in the transport direction for decelerating the passenger transport speed from the constant transport speed to a decelerated final speed, wherein the speeds of the conveyors in the acceleration section and the deceleration section are adapted so that the average acceleration experienced by the passenger over the entire length of the acceleration and deceleration sections is constant, and wherein adjacent successive conveyors in the acceleration and deceleration sections include a common diverting element having a speed change point which the speeds of the adjacent successive conveyors are different in the transport direction.

In one exemplary embodiment of the method, the change of transport speed is kept constant in each step of speed change during the acceleration and deceleration sections.

In other exemplary embodiment of the method, the acceleration section comprises acceleration portions, and constant-speed portions of different lengths alternating with the acceleration portions.

In a further exemplary embodiment of the method, the acceleration portions and constant-speed portions are alternately arranged so that the transport distance in the constant-speed portions is the longer as the transport speed increases.

In yet another exemplary embodiment of the method, the length of the transport distances in the constant speed portions alternating with the acceleration portions is varied as a square of the transport speed.

In still a further exemplary embodiment of the method, the deceleration section comprises deceleration portions, and constant speed portions of different lengths alternating with the deceleration portions.

In another exemplary embodiment of the method, the deceleration portions and constant-speed portions are arranged so that the transport distance in the constant speed portions is the shortened as the transport speed decreases.

In a further exemplary embodiment of the method, the length of the transport distances in the constant-speed portions alternating with the deceleration portions is varied as a square of the transport speed.

In yet another exemplary embodiment of the method, the initial speed and the final speed are on the order of about 0.5-0.7 m/s.

In a further exemplary embodiment of the method, the transport speed in the constant speed section is about 2.5-7 m/s, preferably about 3-6 m/s, and more preferably about 5 m/s.

In another exemplary embodiment of the method, the stepwise change of transport speed in the acceleration section is so adapted that the average acceleration experienced by the passengers is on the order of about 0.3 $m/s^2$.

In still a further exemplary embodiment of the method, the stepwise change of transport speed in the deceleration section is so adapted that the average deceleration experienced by the passengers is on the order of about 0.3 $m/s^2$.

In a further exemplary embodiment of the method, the speed difference between successive constant speeds in the acceleration section and/or deceleration section is on the order of about 0.5 m/s.

In another exemplary embodiment of the travelator, the transport distances of the conveyors in the acceleration section and the deceleration section are of a substantially equal length and the speed difference in each speed change step is constant.

In a further exemplary embodiment of the travelator, the acceleration section contains acceleration portions where successive conveyors have a speed difference between them and constant-speed portions where successive conveyors have the same transport speeds.

In another exemplary embodiment of the travelator, the acceleration portions and constant-speed portions are alternately arranged so that the transport distance in the constant speed portions is longer as the transport speed increases.

In another exemplary embodiment of the travelator, the deceleration section comprises deceleration portions where successive conveyors have a speed difference of a constant magnitude between them, and constant speed portions where successive conveyors have the same transport speeds.

In a further embodiment of the travelator, the deceleration portions and constant speed portions are alternately arranged so that the transport distance in the constant-speed portions is the shortened as the transport speed decreases.

In another exemplary embodiment of the travelator, the length of the transport distances in the acceleration section and deceleration section is varied as a square of the transport speed.

In another exemplary embodiment of the travelator, the point of speed change between two successive conveyors is on a horizontal straight line perpendicular to the transport direction.

According to another exemplary of the travelator, an individual conveyor comprises a first diverting element and a second diverting element located at a distance from the first diverting element. Each diverting element comprises a number of first belt pulleys and a number of second belt pulleys. A transmission ratio exists between the first and the second belt pulleys. The first and the second belt pulleys in each diverting element are arranged alternately in succession fixedly on the same shaft and rotating about a common axis of rotation. Further, the conveyor comprises a number of parallel endless conveyor belts. Each conveyor belt is so guided that it runs over the first belt pulley of the first diverting element and over the second belt pulley of the second diverting element. In adjacent successive conveyors, the second diverting element of the preceding conveyor as seen in the transport direction is the first diverting element of the next conveyor as seen in the transport direction, and thus each diverting element forms a point of speed change between successive conveyors.

In a further exemplary embodiment of the travelator, the transmission ratio between the first belt pulley and the second belt pulley is determined by the ratio of the diameters of the belt pulleys.

In another exemplary embodiment of the travelator, the diameter of the first belt pulley in the acceleration section is larger than the diameter of the second belt pulley.

In another exemplary embodiment of the travelator, the diameter of the first belt pulley in the deceleration section is smaller than the diameter of the second belt pulley.

In another exemplary embodiment of the travelator, the endless conveyor belts are cogged belts. The first belt pulley and the second belt pulley are cogged belt pulleys having different numbers of teeth, the transmission ratio between the first and the second belt pulleys being determined by the ratio of the numbers of teeth on the belt pulleys.

In a further exemplary embodiment of the travelator, the transmission ratio between the first belt pulley and second belt pulley in the acceleration section is $1<i\leqq 1.1$.

In another exemplary embodiment of the travelator, the transmission ratio between the first belt pulley and the second belt pulley in the deceleration section is $1>i\geqq 0.9$.

In a further embodiment of the travelator, the initial speed and the final speed of the travelator are on the order of about 0.5-0.7 m/s.

In another exemplary embodiment of the travelator, the transport speed in the constant-speed section of the travelator is on the order of about 2.5-7 m/s, preferably about 3-6 m/s, and most preferably about 5 m/s.

In still a further exemplary embodiment of the travelator, the stepwise change of transport speed in the acceleration section is adapted so that the average acceleration experienced by the passengers is on the order of about 0.3 $m/s^2$.

In another exemplary embodiment of the travelator, the stepwise change of transport speed in the deceleration section is adapted so that the average deceleration experienced by the passengers is on the order of about 0.3 $m/s^2$.

In another exemplary embodiment of the travelator, the speed difference between successive conveyors is on the order of 0.5 m/s.

It is preferable to keep the transport surface of the travelator unbroken or at least such that the passenger will find it to be continuous, instead of effecting the passenger acceleration or deceleration in the conveyors by using successive sub-conveyors separated from each other, which would necessarily leave a gap between the slower and the faster sub-conveyors. An advantageous embodiment according to the invention can be achieved, for example, by using a structure common to successive sub-conveyors which connects them to each other and on which the motion of one sub-conveyor and that of the next sub-conveyor are present simultaneously. According to one exemplary embodiment of the invention there is thus provided a diverting element, such as a roller or equivalent, which is common to the successive sub-conveyors. By using a common diverting element, the speed change between successive sub-conveyors can be adapted without separating the sub-conveyors from each other.

BRIEF DESCRIPTION OF THE DRAWINGS

In the following, the invention will be described in detail with reference to exemplary embodiments and the attached drawings, wherein.

DETAILED DESCRIPTION OF THE INVENTION

Figure 1:
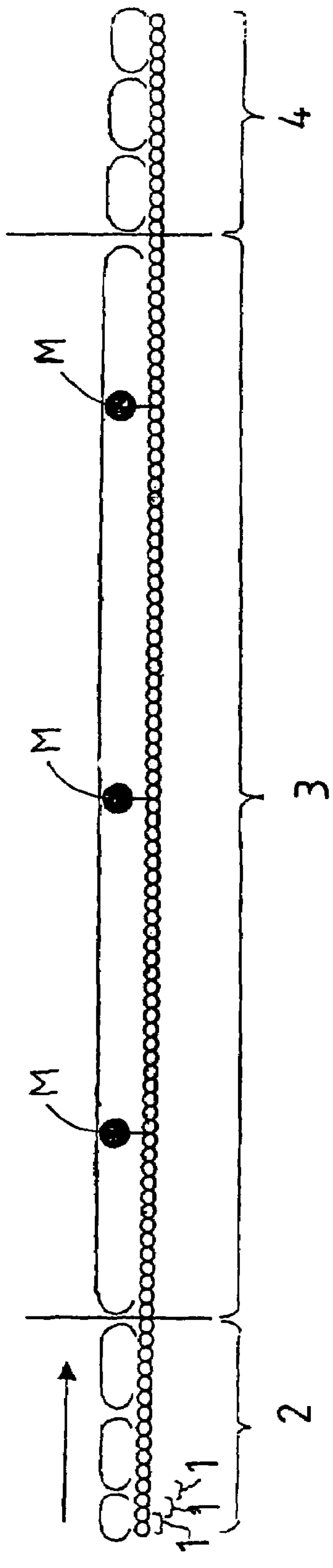
FIG. 1 presents a diagrammatic side view of an embodiment of the travelator of the invention.

FIG. 1 presents a travelator for passenger transport, comprising a large number of successive conveyors 1. The conveyors are so arranged that, in the transport direction, they form an acceleration section 2, a constant-speed section 3 and a deceleration section 4. In the acceleration section 2, successive conveyors 1 have constant speeds increasing stepwise in the transport direction, whereby the passenger transport speed is accelerated from a substantially slow initial speed to a heightened transport speed. The constant-speed section 3 contains conveyors for transporting the passenger at a constant transport speed. The deceleration section 4 contains successive conveyors 1 having constant speeds decreasing stepwise in the transport direction for decelerating the passenger transport speed from the constant transport speed to a slow final speed. The initial speed and final speed of the travelator are of the order of about 0.5-0.7 m/s. The transport speed in the constant-speed section is of the order of about 2.5-7 m/s, suitably about 3-6 m/s, and preferably about 5 m/s.

In the acceleration and deceleration sections, the stepwise change of the transport speed is so adapted that the average acceleration experienced by the passengers is constant substantially throughout the entire acceleration/deceleration section. The average acceleration/deceleration is preferably on the order of about 0.3 $m/s^2$. The speed difference between successive conveyors is preferably on the order of 0.5 m/s.

Figure 2:
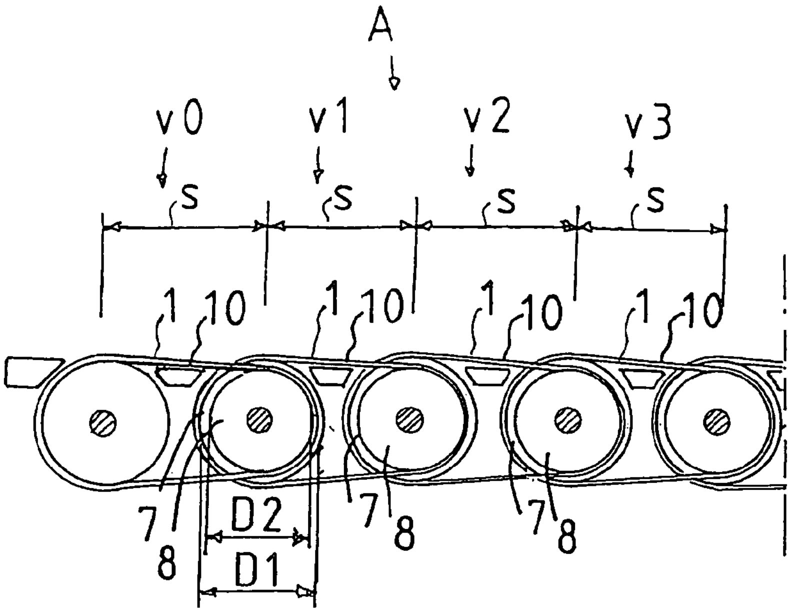
FIG. 2 presents a diagrammatic side view of a part of the beginning of the acceleration section of the travelator shown in FIG. 1.
Figure 3:
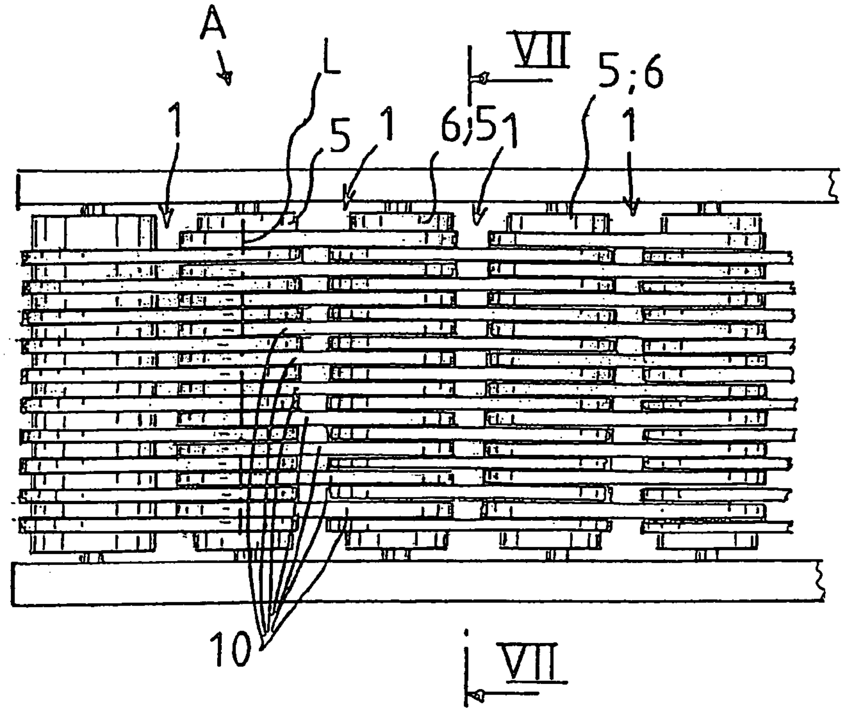
FIG. 3 presents a diagrammatic top view of the travelator of FIG. 2.

FIGS. 2 and 3 show the structure of the conveyors 1. The transport distances s of individual conveyors 1 are substantially of equal length. The speed difference between the conveyors 1 in each speed change step is constant, i.e. $v1-v0=v2-v1=v3-v2$ and so on. The conveyors 1 are belt conveyors implemented using a number of adjacent narrow endless conveyor belts 10.

Each conveyor 1 comprises a first diverting element 5 and a second diverting element 6, which is located at a distance from the first diverting element 5. Each diverting element 5, 6 comprises a number of first belt pulleys 7 and a number of second belt pulleys 8.

Figure 7:
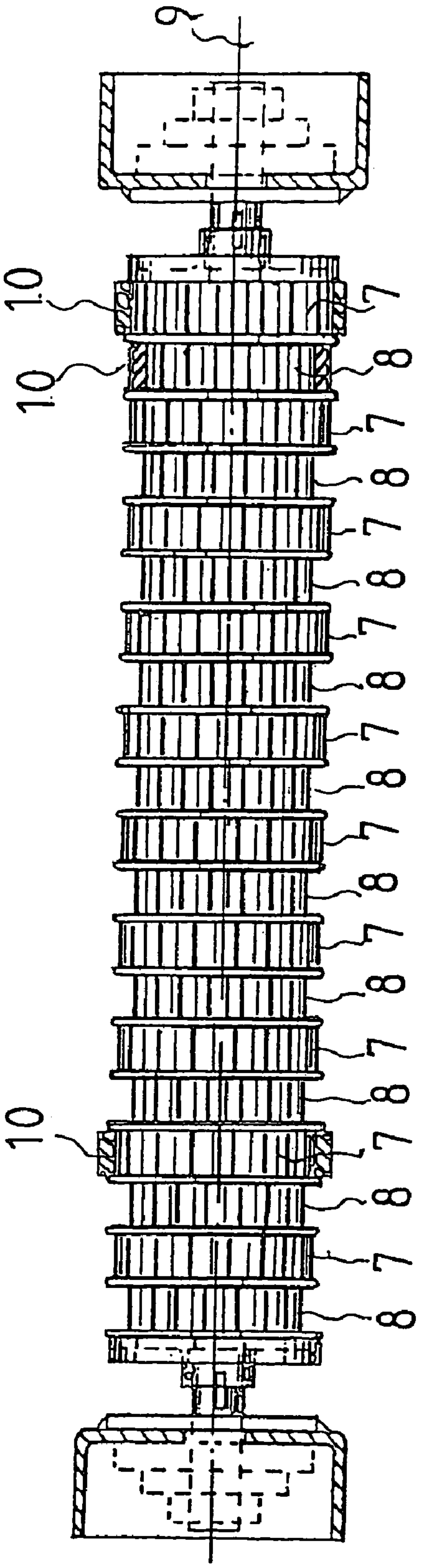
FIG. 7 presents section VII-VII taken from FIG. 3.

As is also shown in FIG. 7, the first and second belt pulleys 7 and 8 in each diverting element 5, 6 are placed alternately in succession fixedly on the same shaft and they can thus rotate about a common axis of rotation 9 at the same speed.

A transmission ratio exists between the first belt pulleys 7 and the second belt pulleys 8. In the acceleration section 2, the transmission ratio i between the first belt pulley 7 and the second belt pulley 8 is preferably $1<i\leqq 1.1$. In the deceleration section, the transmission ratio between the first belt pulley 7 and the second belt pulley 8 is $1>i\geqq 0.9$.

In the example shown in FIG. 2, the transmission ratio in the acceleration section has been formed by using a first belt pulley 7 having a diameter D1 somewhat larger than the diameter D2 of the second belt pulley. Correspondingly, in the deceleration section 4 the first belt pulley has a diameter D1 smaller than the diameter D2 of the second belt pulley.

In FIG. 2, the difference between the diameters D1, D2 is somewhat exaggerated for better visual perception. In practice, if a first belt pulley 7 having a diameter D1 of e.g. 10 cm is selected, then the second belt pulley 8 must have a diameter D2 only about 2-3 mm smaller if the speed difference between successive conveyors 1 is desired to be about 0.5 m/s. Each one of the parallel endless conveyor belts 10 is passed over the first belt pulley 7 of the first diverting element 5 and over the second belt pulley 8 of the second diverting element 6 as illustrated in FIGS. 2 and 3. In adjacent successive conveyors 1, the second diverting element 6 of the preceding conveyor in the transport direction is the first diverting element 5 of the next conveyor in the transport direction. The point of speed change between successive conveyors 1 is on each diverting element 5, 6 on a horizontal line L perpendicularly transverse to the transport direction.

The endless conveyor belts 10 may be flat belts, V-belts or cogged belts. They are preferably also used as power transmitting elements, in which case no external transmission is needed. The conveyors 1 can be driven by motors M (see FIG. 1) placed e.g. at 50-meter distances, from which the power is transmitted to each conveyor 1 by the conveyor belts 10 themselves. This provides the advantage of simple construction as driving power needs to be supplied to the diverting elements 5, 6 only here and there. The advantages of cogged belts over triangular or flat belts are smaller losses and a more reliable drive. When the conveyor belts 10 used are cogged belts, correspondingly the first belt pulley 7 and the second belt pulley 8 are cogged belt pulleys having different numbers Z1, Z2 of teeth, so the transmission ratio between the first and the second belt pulleys is determined by the ratio Z1/Z2 of the numbers of teeth on the belt pulleys.

Figure 4:
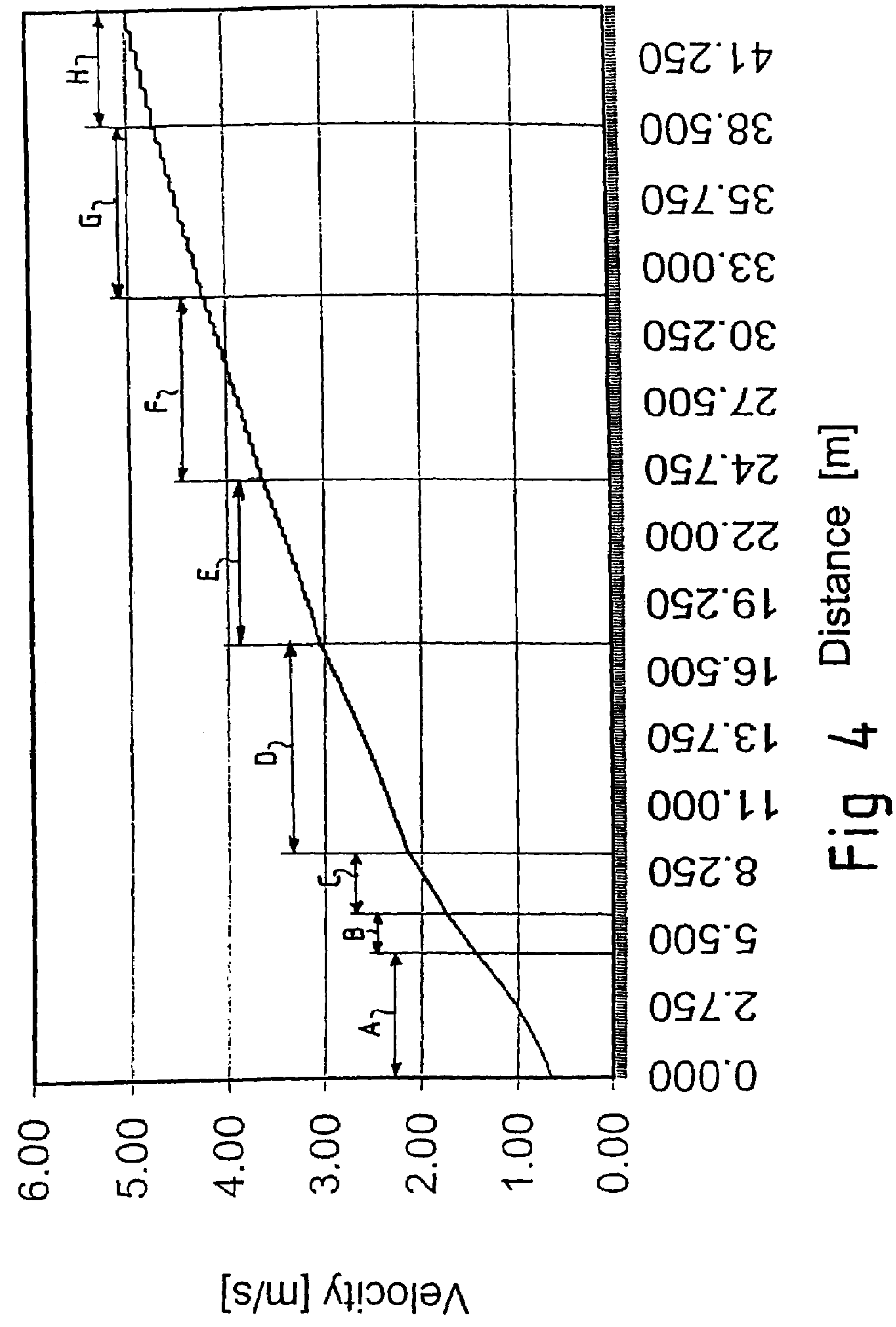
FIG. 4 presents a mathematically generated diagram representing transport speed as a function of distance in the acceleration section of the travelator in an embodiment of the travelator of the invention according to an embodiment of the method of the invention.
Figure 5:
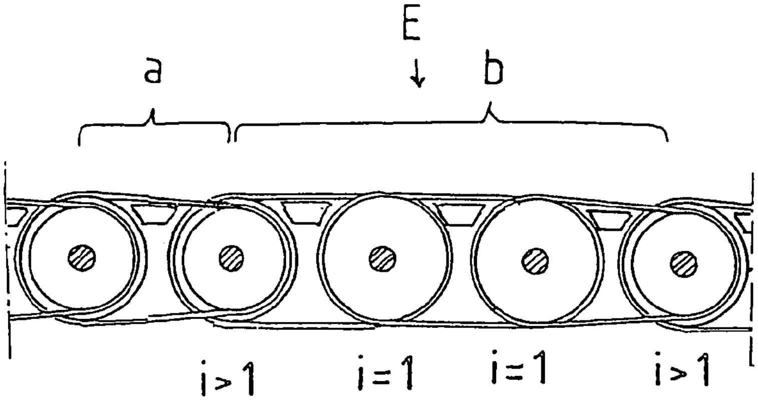
FIG. 5 presents a diagrammatic side view of a part of range E of the acceleration section of the travelator in FIG. 4.
Figure 6:
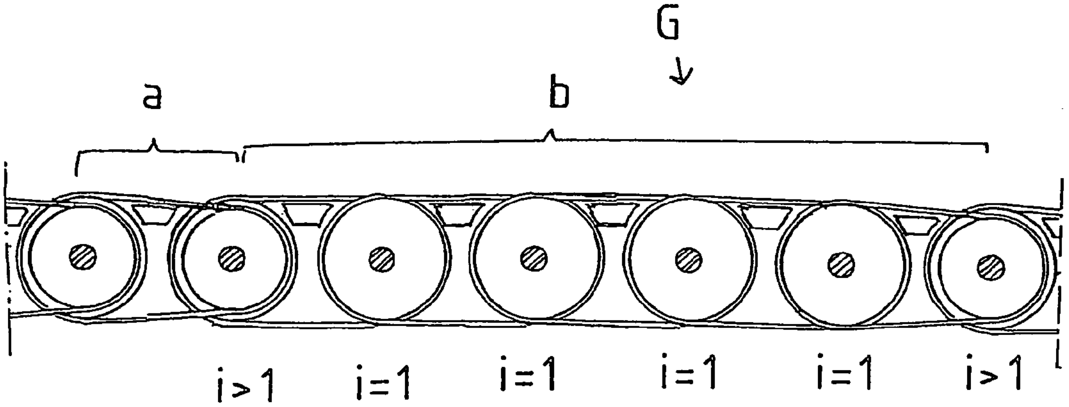
FIG. 6 presents a diagrammatic side view of a part of range G of the acceleration section of the travelator in FIG. 4.

FIG. 4 represents the change of transport speed over the entire distance of the acceleration section 1 in an example situation where the acceleration section/section has been implemented using conveyors 1 in such manner that the speeds of the conveyors 1 in the acceleration section 2 are so adapted that the average acceleration experienced by the passengers is constant substantially over the entire length of the acceleration section. With reference to FIGS. 5 and 6, this is achieved in that the acceleration section 2 contains acceleration portions a, where successive conveyors 1 have a speed difference between them, and additionally constant-speed portions b, where successive conveyors 1 have the same transport speeds. The acceleration portions a and the constant-speed portions b have been fitted to alternate so that the transport distance in the constant-speed portions b is the longer the higher is the transport speed. The graph in FIG. 4 shows this clearly as increased step lengths starting from range D towards higher speeds. The length of the transport distances in the constant-speed portions a has been fitted to change as a square of the transport speed.

In the example in FIG. 4, the distance between the axes 9 of rotation of the diverting elements 5, 6 arranged at constant distances is 0.125 m. The total length of the acceleration section is 43.125 m. The initial speed is 0.65 m/s, in other words, the conveyor 1 in section A in FIG. 4 rotates at this speed. A constant average acceleration of 0.3 $m/s^2$ has been achieved by the following means.

In range A (corresponding to a transport distance of 0-5 m), successive conveyors 1 have been arranged as illustrated in FIGS. 2 and 3, i.e. so that a speed change occurs at each diverting element. In each diverting element, the number Z1 of teeth on the first belt pulley is 100 and the number Z2 of teeth on the second belt pulley is 98.

Arranged by turns in range B (transport distance 5.125 m-6.500 m) are diverting elements in which one diverting element has a first belt pulley with 100 teeth Z1 and a second belt pulley with 99 teeth Z2 while the other diverting element has a first belt pulley with 100 teeth Z1 and a second belt pulley with 98 teeth Z2.

In each diverting element in range C (transport distance 6.625 m-9.000 m), the number of teeth Z1 on the first belt pulley is 100 and the number of teeth Z2 on the second belt pulley is 99.

The conveyors in range D (transport distance 9.125 m-17.500 m) are so arranged that it contains alternately diverting elements in which the number of teeth Z1 on the first belt pulley is 100 and the number of teeth Z2 of the second belt pulley is 99 while in the other diverting element the number of teeth Z1 on the first belt pulley is 100 and the number of teeth Z2 on the second belt pulley is 100, in other words, every second diverting element has a transmission ratio differing from 1, which results in a speed change. Thus, each acceleration portion a is followed by a constant-speed portion b of the same length.

The conveyors in range E (transport distance 17.625 m-24.250 m) (see also FIG. 5) have been so arranged that in one diverting element the number of teeth Z1 on the first belt pulley is 100 and the number of teeth Z2 on the second belt pulley is 99 while in the next two other diverting elements the number of teeth Z1 on the first belt pulley is 100 and the number of teeth Z2 on the second belt pulley is 100, in other words, only every third diverting element has a transmission ratio differing from 1, which causes a speed change. Therefore, as can be seen from FIG. 5, repeatedly in range E each acceleration portion a is always followed by a constant-speed portion b of a length twice that of the acceleration portion a.

The conveyors in range F (transport distance 24.375 m-31.750 m) have been so arranged that in one diverting element the number of teeth Z1 on the first belt pulley is 100 and the number of teeth Z2 on the second belt pulley is 99 while in the next three diverting elements the number of teeth Z1 on the first belt pulley is 100 and the number of teeth Z2 on the second belt pulley is 100, in other words, only every fourth diverting element has a transmission ratio differing from 1, causing a speed change. Repeatedly in range F each acceleration portion a is thus always followed by a constant-speed portion b of a length three times that of the acceleration portion a.

The conveyors in range G (transport distance 31.875 m-38.625 m) have been so arranged that in one diverting element the number of teeth Z1 on the first belt pulley is 100 and the number of teeth Z2 on the second belt pulley is 99 while in the next four other diverting elements the number of teeth Z1 on the first belt pulley is 100 and the number of teeth Z2 on the second belt pulley is 100, in other words, only every fifth diverting element has a transmission ratio differing from 1, causing a speed change. Thus, as can be seen from FIG. 6, repeatedly in range G each acceleration portion a is always followed by a constant-speed portion b of a length four times that of the acceleration portion a.

Finally, the conveyors in range H (transport distance 38.750 m-42.125 m) have been so arranged that in one diverting element the number of teeth Z1 on the first belt pulley is 100 and the number of teeth Z2 on the second belt pulley is 99 while in the next five other diverting elements the number of teeth Z1 on the first belt pulley is 100 and the number of teeth Z2 on the second belt pulley is 100, in other words, only every sixth diverting element has a transmission ratio differing from 1, causing a speed change. Thus, repeatedly in range H each acceleration portion a is always followed by a constant-speed portion b of a length five times that of the acceleration portion a.

Although the above description covers the arrangement in the acceleration section, it is obvious that the deceleration section can be implemented in a completely corresponding manner by arranging the conveyor arrangement in a mirror image-like fashion relative to the arrangement used in the acceleration section.

The invention is not limited to the embodiment examples described above; instead, many variations are possible within the scope of the inventive concept defined in the claims.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for transporting passengers in a transport direction on a travelator having successive conveyors, each successive conveyor comprising: first and second diverting elements located at a distance from each other, each one of the diverting elements comprising a first belt pulley and a second belt pulley, with a transmission ratio existing between the first and second belt pulleys; and an endless conveyor belt, the conveyor belt running over the first belt pulley of the first diverting element and over the second belt pulley of the second diverting element, wherein adjacent successive conveyors share a common diverting element such that the second diverting element of a preceding conveyor in the transport direction is the first diverting element of a next successive conveyor in the transport direction, the method comprising:

accelerating the passengers in an acceleration section by stepwise increasing constant speeds of successive conveyors in the transport direction from a substantially slow initial speed to a heightened transport speed such that an average acceleration experienced by the passengers is substantially constant throughout the entire acceleration section;

transporting the passengers at a constant speed on successive conveyors in a constant-speed section; and decelerating the passengers in a deceleration section by stepwise decreasing the constant speeds of successive conveyors to a substantially slow final speed such that the average deceleration experienced by the passengers is substantially constant throughout the entire deceleration section, wherein at one of the common diverting elements in the acceleration and deceleration sections the speeds of the adjacent successive conveyors are different in the transport direction.

2. The method according to claim 1, wherein the acceleration and deceleration steps include keeping the change of transport speed constant in each stepwise change of speed.

3. The method according to claim 1, wherein the acceleration section comprises acceleration portions and constant-speed portions, and the method includes alternating the acceleration portions with constant speed portions of different lengths.

4. The method according to claim 3, including alternately arranging the acceleration portions and constant-speed portions so that a transport distance in the constant-speed portions is longer as the transport speed increases.

5. The method according to claim 4, including varying the length of the transport distances in the constant-speed portions as a square of the transport speed.

6. The method according to claim 1, wherein the deceleration section includes deceleration portions and constant speed portions and the method includes alternating the deceleration portions with constant-speed portions of different lengths.

7. The method according to claim 6, including alternately arranging the deceleration portions and constant-speed portions so that a transport distance in the constant-speed portions is shortened as the transport speed decreases.

8. The method according to claim 7, including varying the length of the transport distances in the constant-speed portions as a square of the transport speed.

9. The method according to claim 1, wherein the initial speed and the final speed are on the order of about 0.5-0.7 m/s.

10. The method according to claim 1, wherein the transport speed in the constant speed section is about 2.5-7 m/s.

11. The method according to claim 1, wherein the transport speed in the constant speed section is about 3-6 m/s.

12. The method according to claim 1, wherein the transport speed in the constant speed section is about 5 m/s.

13. The method according to claim 1, including adapting the stepwise change of transport speed in the acceleration section so that the average acceleration experienced by the passengers is on the order of about 0.3 $m/s^2$.

14. The method according to claim 1, including adapting the stepwise change of transport speed in the deceleration section so that the average deceleration experienced by the passengers is on the order of about 0.3 $m/s^2$.

15. The method according to claim 1, wherein the speed difference between the constant speeds of successive conveyors in the acceleration and deceleration sections is on the order of about 0.5 m/s.

16. A travelator for passenger transport in a transport direction, comprising:

a plurality of successive conveyors arranged to form (a) an acceleration section, which includes successive conveyors having constant speeds stepwise increasing in the transport direction for accelerating a passenger from a substantially slow initial speed to an increased transport speed, (b) a constant-speed section containing at least one conveyor having a constant passenger transport speed, and (c) a deceleration section including successive conveyors having constant speeds stepwise decreasing in the transport direction for decelerating the passenger from the constant transport speed to a decelerated final speed, wherein the speeds of the conveyors in the acceleration section and the deceleration section are adapted so that the average acceleration experienced by the passenger over the entire length of the acceleration and deceleration sections is constant, and wherein adjacent successive conveyors in the acceleration and deceleration sections include a common diverting element having a speed change point at which the speeds of the adjacent successive conveyors are different in the transport direction.

17. The travelator according to claim 16, wherein transport distances of the acceleration section and deceleration section are of a substantially equal length and the speed difference in each stepwise speed change is constant.

18. The travelator according to claim 16, wherein the acceleration section contains acceleration portions where successive conveyors have a speed difference of a constant magnitude between them, and constant-speed portions where successive conveyors have the same transport speeds.

19. The travelator according to claim 18, wherein the acceleration portions and constant-speed portions are alternately arranged and the transport distance in the constant-speed portions is increased as the transport speed increases.

20. The travelator according to claim 16, wherein the deceleration section comprises deceleration portions where successive conveyors have a speed difference of a constant magnitude between them, and constant-speed portions where successive conveyors have the same transport speeds.

21. The travelator according to claim 20, wherein the deceleration portions and constant-speed portions are alternately arranged so that the transport distance in the constant speed portions is shorter as the transport speed decreases.

22. The travelator according to claim 19, wherein the length of the transport distances of the constant-speed portions in the acceleration section varies as the square of the transport speed.

23. The travelator according to claim 16, wherein the point of speed change between two successive conveyors is on a horizontal straight line perpendicular to the transport direction.

24. The travelator according to claim 16, wherein each successive conveyor comprises:

first and second diverting elements located at a distance from each other, each one of the diverting elements comprising a number of first belt pulleys and a number of second belt pulleys, with a transmission ratio existing between the first and second belt pulleys, and which first and second belt pulleys in each diverting element are arranged alternately in succession fixedly on the same shaft and rotatable about a common axis of rotation; and a number of parallel endless conveyor belts, each one of the conveyor belts running over the first belt pulley of the first diverting element and over the second belt pulley of the second diverting element;

wherein in adjacent successive conveyors, the second diverting element of a preceding conveyor in the transport direction is the first diverting element of the next conveyor in the transport direction, so that each diverting element includes a point of speed change between successive conveyors.

25. The travelator according to claim 24, wherein the transmission ratio between the first belt pulley and the second belt pulley is determined by a ratio of the diameters of the belt pulleys.

26. The travelator according to claim 24, wherein in the acceleration section, the diameter of the first belt pulley is larger than the diameter of the second belt pulley.

27. The travelator according to claim 24, wherein in the deceleration section, the diameter of the first belt pulley is smaller than the diameter of the second belt pulley.

28. The travelator according to claim 24, wherein the endless conveyor belts comprise cogged belts; the first belt pulley and the second belt pulley comprise cogged belt pulleys having different numbers of teeth, and the transmission ratio between the first and the second belt pulleys is determined by the ratio of the numbers of teeth on the belt pulleys.

29. The travelator according to 24, wherein the transmission ratio i between the first belt pulley and second belt pulley in the acceleration section is $1<i\leqq 1.1$.

30. The travelator according to claim 24, wherein the transmission ratio i between the first belt pulley and the second belt pulley in the deceleration section is $1>i\geqq 0.9$.

31. The travelator according to claim 16, wherein the initial speed and the final speed of the travelator are on the order of about 0.5-0.7 m/s.

32. The travelator according to claim 16, wherein the transport speed in the constant-speed section of the travelator is on the order of about 2.5-7 m/s.

33. The travelator according to claim 16, wherein the transport speed in the constant-speed section of the travelator is on the order of about 3-6 m/s.

34. The travelator according to claim 16, wherein the transport speed in the constant-speed section of the travelator is on the order of about 5 m/s.

35. The travelator according to claim 16, wherein the stepwise change of transport speed in the acceleration section is adapted so that the average acceleration experienced by the passengers is on the order of about 0.3 $m/s^2$.

36. The travelator according to claim 16, wherein the stepwise change of transport speed in the deceleration section is adapted so that the average deceleration experienced by the passengers is on the order of about 0.3 $m/s^2$.

37. The travelator according to claim 16, wherein the speed difference between the constant speeds of successive conveyors in the acceleration and deceleration sections is of the order of 0.5 m/s.

* * * * *